J. E. OGDEN & A. T. PRESCOTT.
DOOR.
APPLICATION FILED APR. 28, 1914.
1,282,113.
Patented Oct. 22, 1918.
8 SHEETS—SHEET 2.
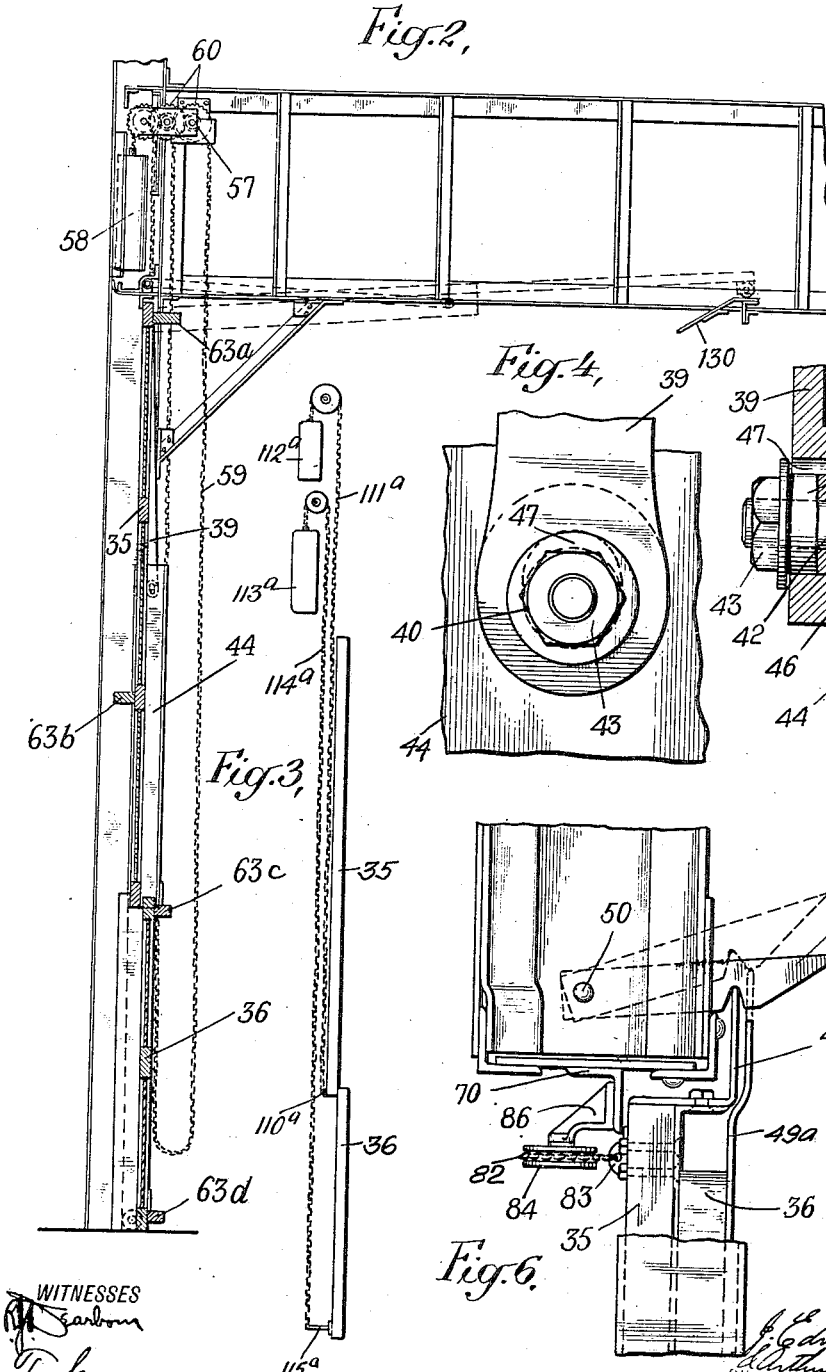

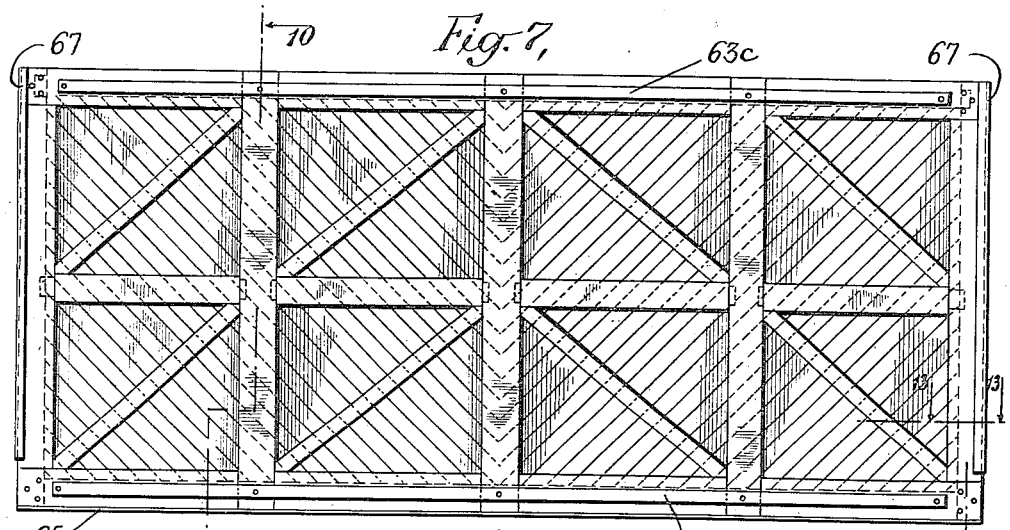

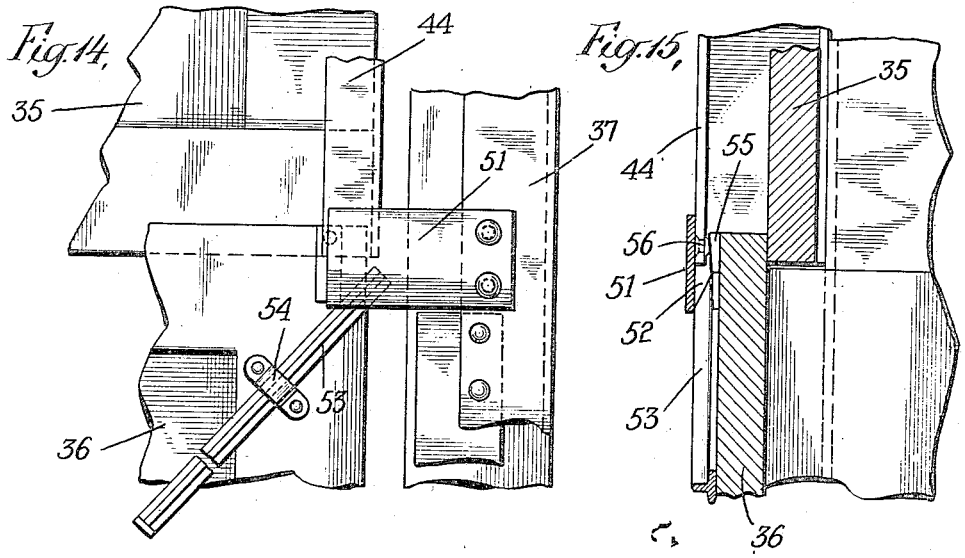
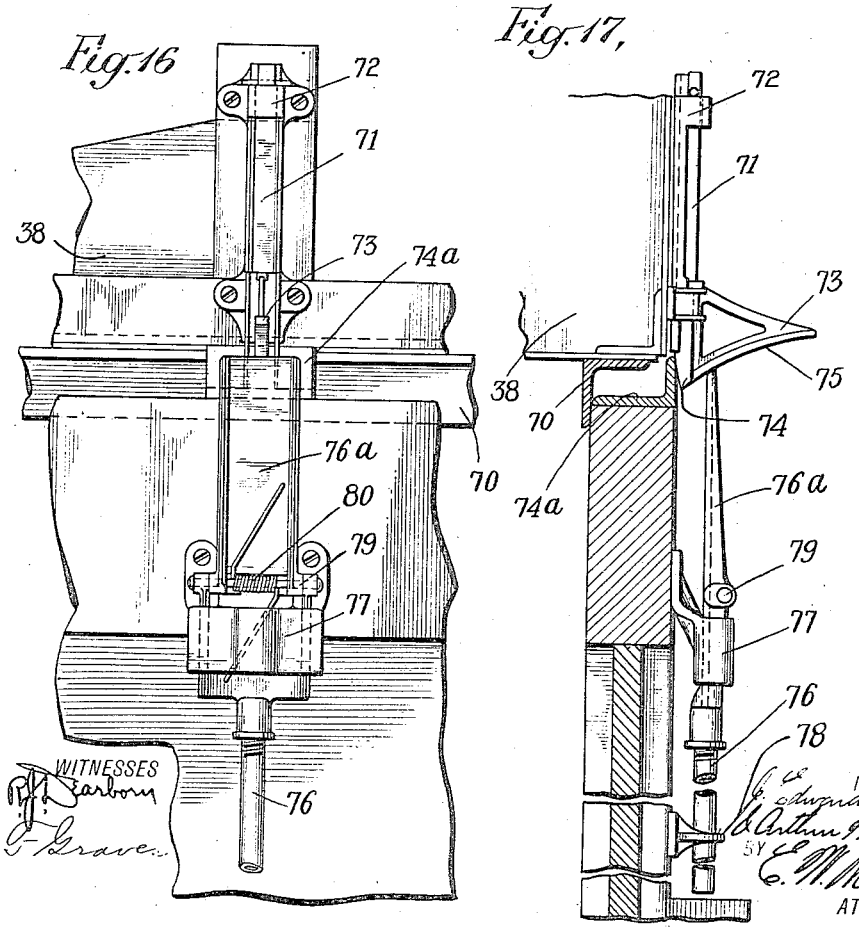

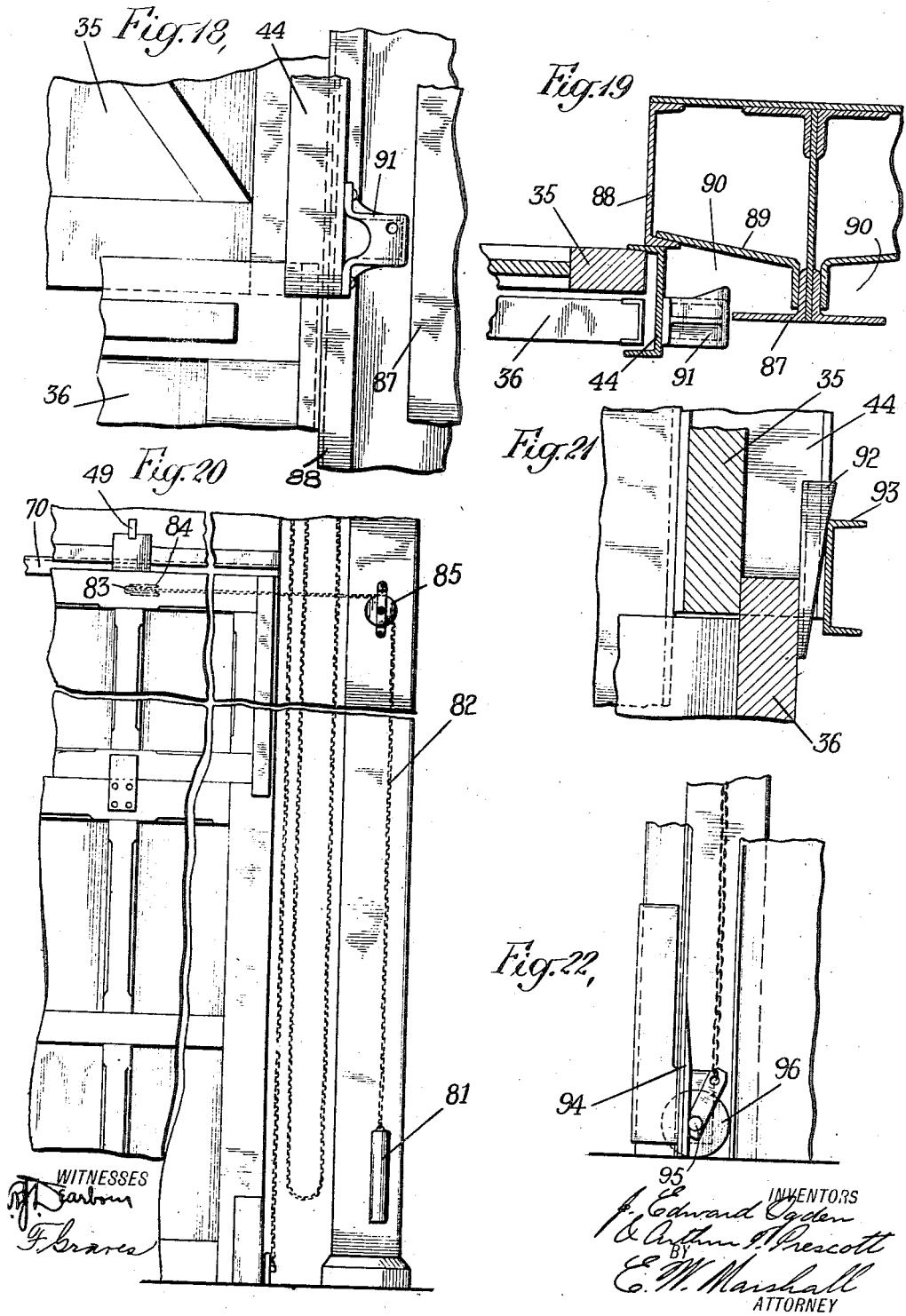

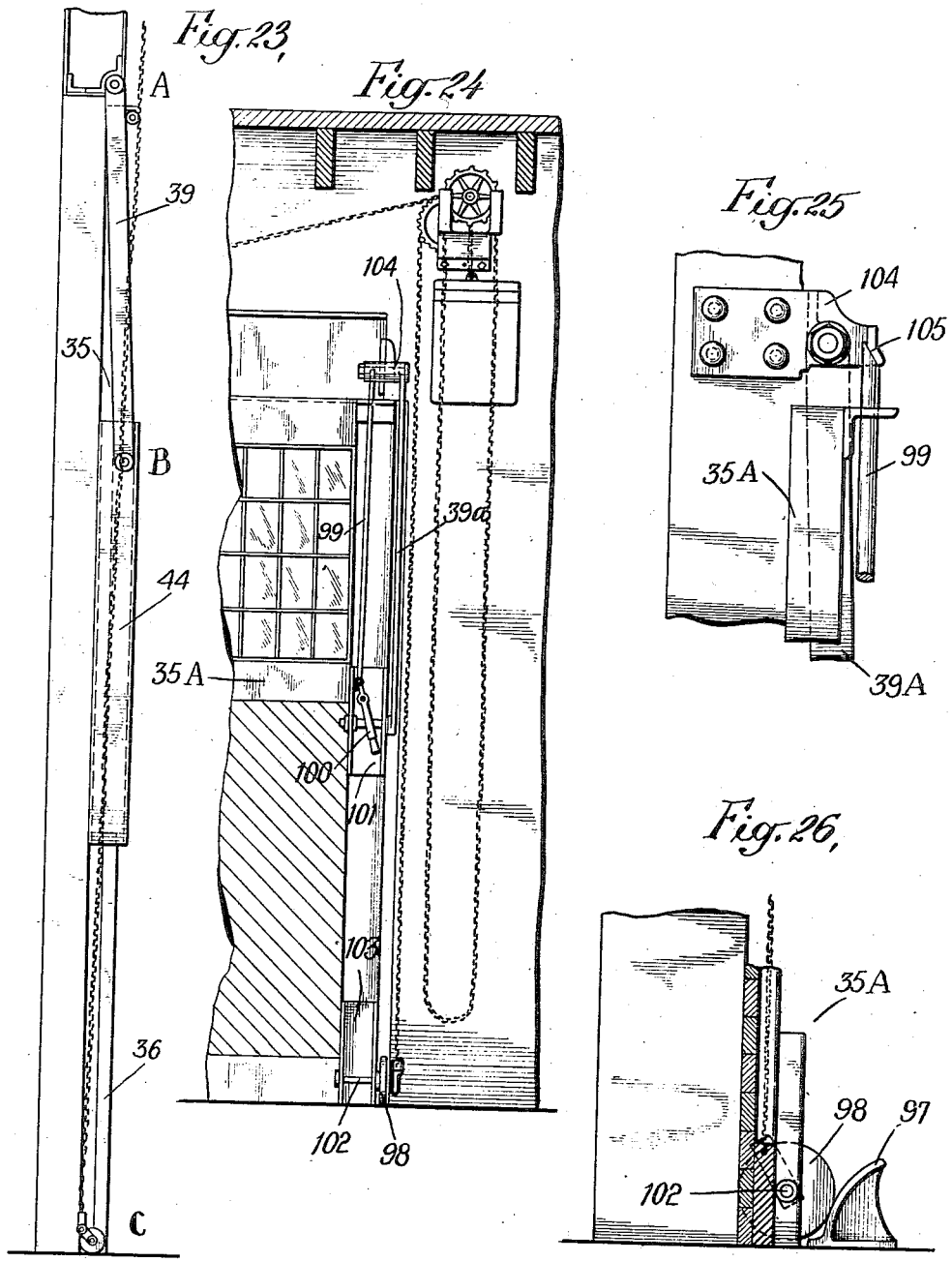

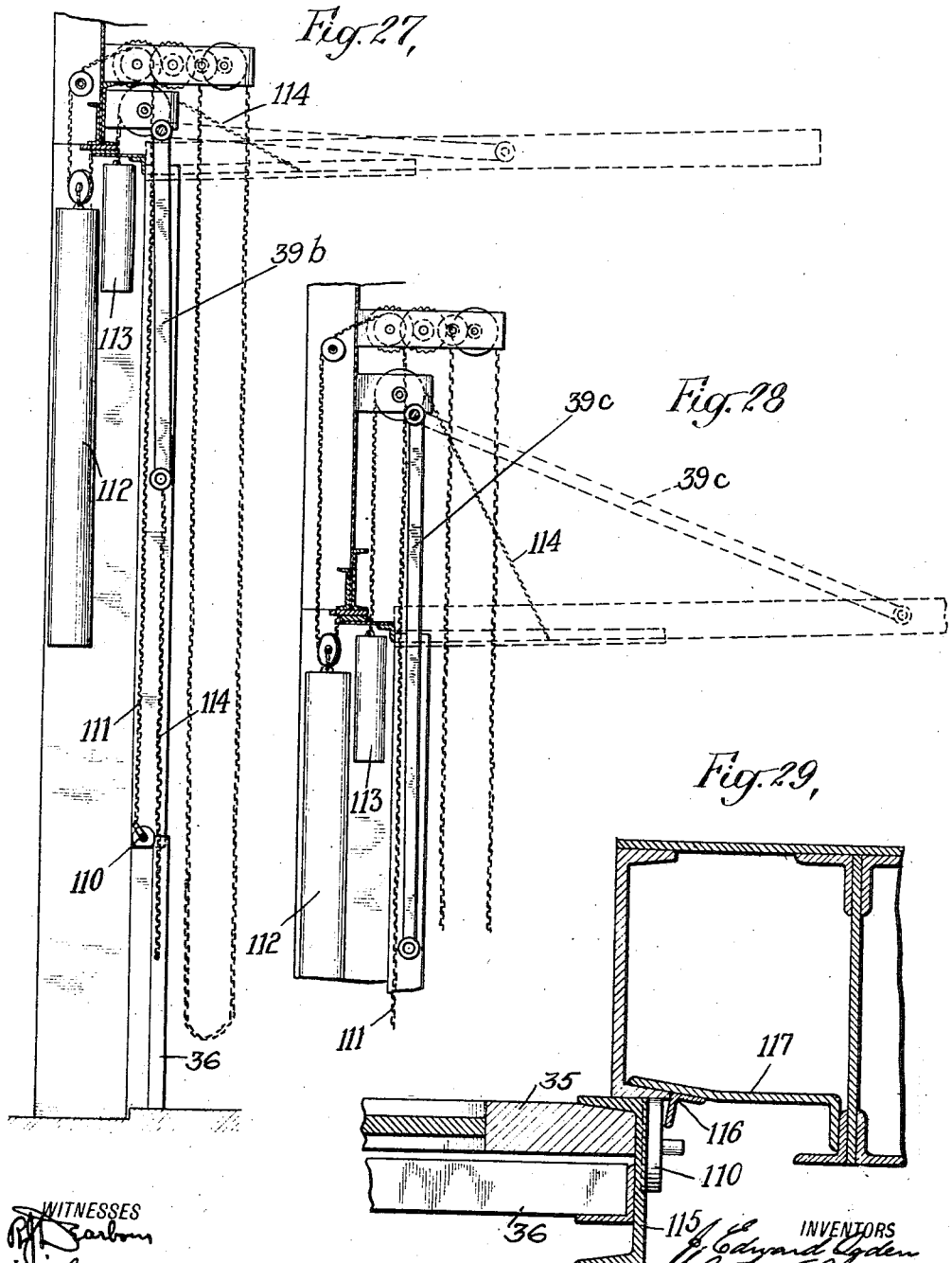

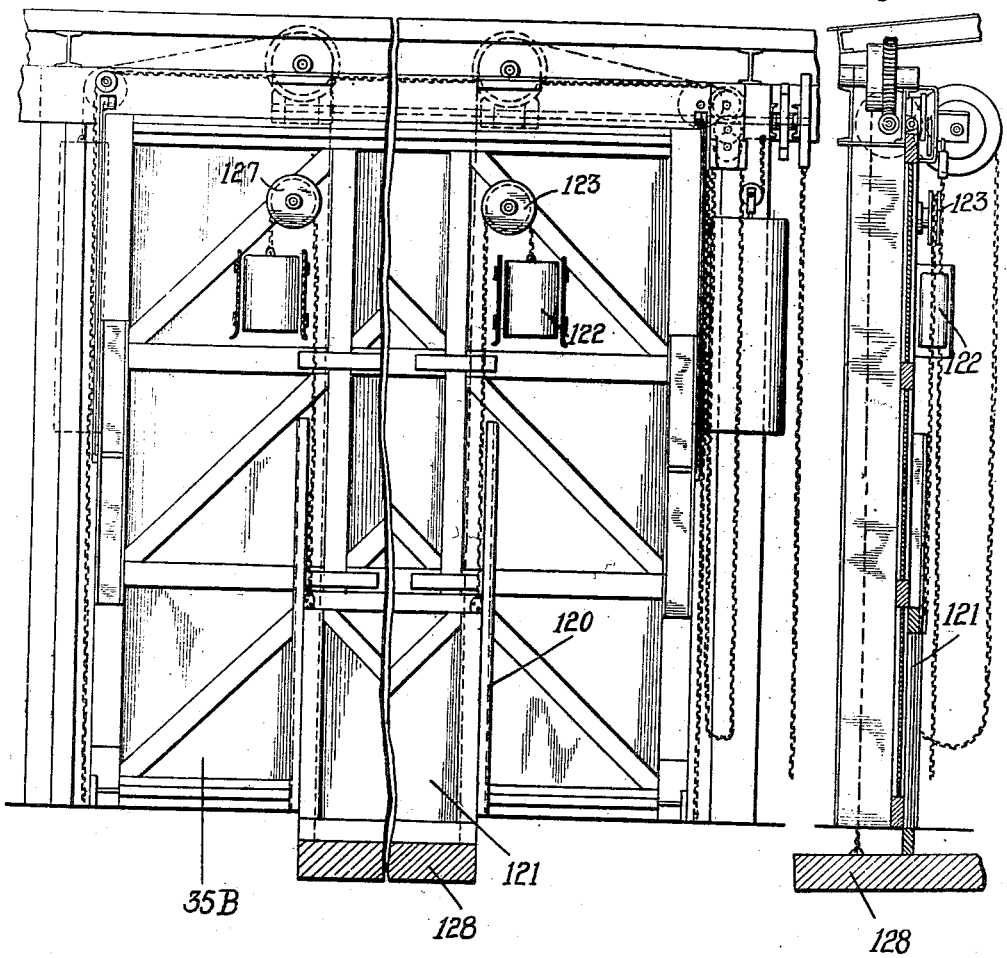
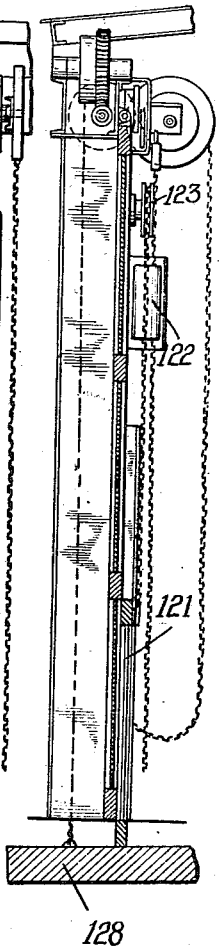

UNITED STATES PATENT OFFICE.

JOHN EDWARD OGDEN, OF BROOKLYN, NEW YORK, AND ARTHUR T. PRESCOTT, OF EAST ORANGE, NEW JERSEY, ASSIGNORS TO GEORGE H. FROTHINGHAM CO., OF NEW YORK, N. Y., A CORPORATION OF NEW YORK.

DOOR.

1,282,113.       Specification of Letters Patent.     Patented Oct. 22, 1918.

Application filed April 28, 1914. Serial No. 834,893.

*To all whom it may concern:*

Be it known that we, JOHN EDWARD OGDEN, a citizen of the United States of America, and a resident of Brooklyn, Kings county, and State of New York, and ARTHUR T. PRESCOTT, a citizen of the United States, and a resident of East Orange, Essex county, and State of New Jersey, have invented certain new and useful Improvements in Doors, of which the following is a specification, reference being had to the accompanying drawings, forming a part thereof.

Our invention relates to doors and to means for operating the same and has special reference to doors of the general character set forth in Patent No. 973,691, granted October 25, 1910, to John Edward Ogden, one of the parties hereto.

One object of our invention is to provide an improved door structure which shall be specially adapted for use in large sizes, for closing the openings of pier sheds, warehouses and the like.

Other objects are to provide means for preventing the supporting links, such as are shown in the aforesaid patent, from being subjected to compression strains during the operation of the door; means for holding the door firmly against the casing after it has been closed and for locking the lower to the upper section, to prevent the opening of the door from the outside; means controllable by the upward movement of the lower section for holding the top of the door in place when the door is closed; and means for stiffening the door against wind pressure and against stresses produced by its own weight when supported in a horizontal position, without interfering with the overlapping of the lower and upper sections.

Another object is to provide for the independent opening of the sections of the multiple section door to enable either to be opened without the other or both to be opened together.

Other objects and advantages of our invention will be set forth hereinafter and in order that our invention may be thoroughly understood we will proceed to describe the same in the following specification and then point out the novel features thereof in appended claims.

Referring to the drawings:

Figure 1 is an elevation, looking upon the inside, of a door and its casing and operating mechanism arranged and constructed in accordance with our invention.

A sectional elevation of the same door, taken on the line 2—2 of Fig. 1, is shown in Fig. 2.

Fig. 3 is a diagrammatic view of a door of the same type, having its upper section equipped with independent counterweights.

Fig. 4 is an elevation and Fig. 5 a sectional view, both drawn to a larger scale, showing in detail, the lower end of one of the suspension links and its attaching pin.

Figure 1:
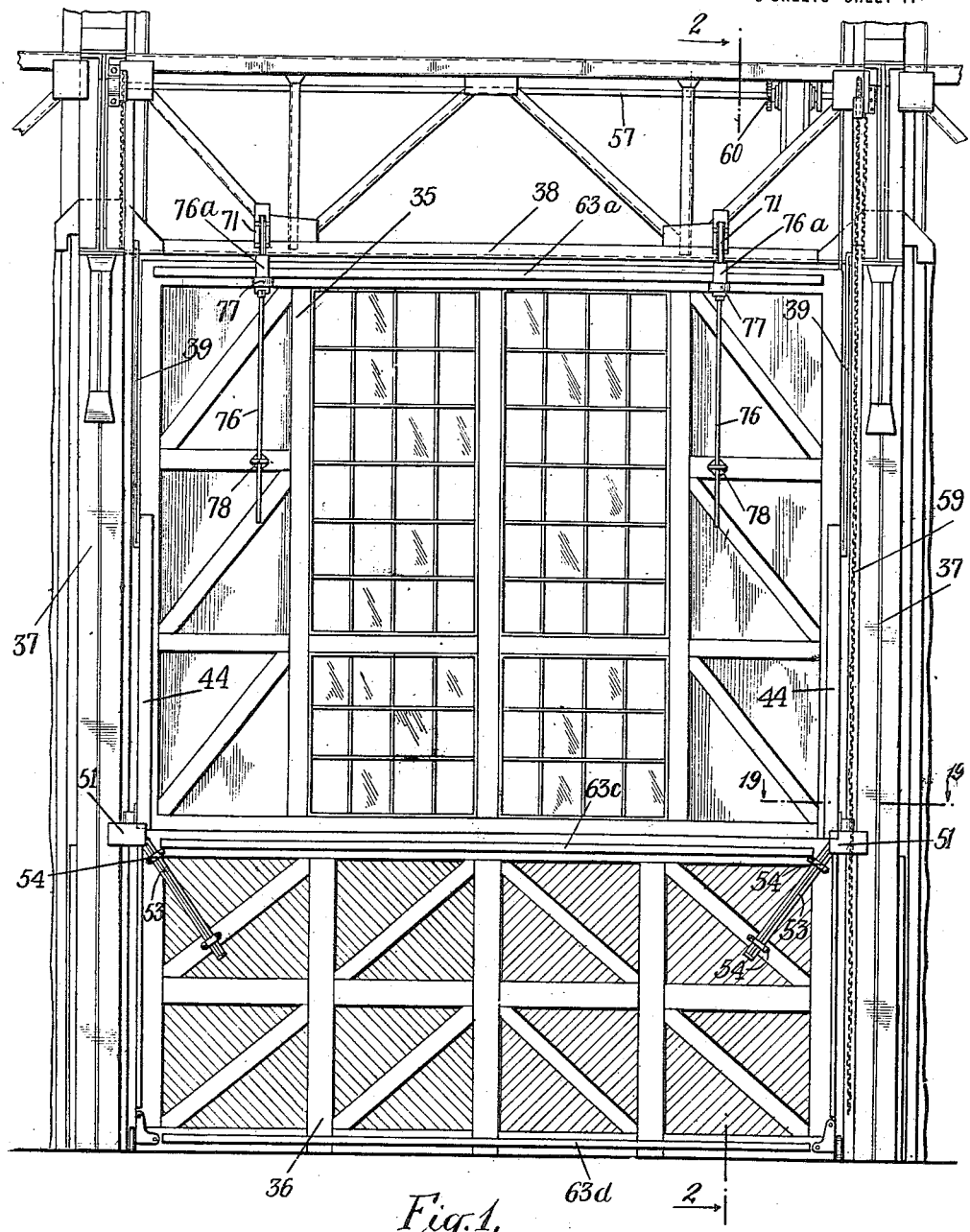

The top portion of the upper door section is shown in elevation in Fig. 6, together with a suitable lock or latch and the adjacent portion of the door casing.

The lower section of the door is shown in elevation in Fig. 7.

Fig. 8 is a plan view of the same section and clearly discloses one of the neutral trusses with which the section is equipped.

A truss of a different character such as is adapted to replace the neutral trusses on the inside of the door, is shown in Fig. 9.

The details of the door structure which we prefer to employ are shown on a larger scale in Figs. 10 to 13 inclusive, Figs. 10, 12 and 13 being sectional views taken respectively on the lines 10—10, 12, and 13—13 of Fig. 7, and Fig. 11 a fragmentary plan view illustrating the manner of fitting a neutral truss to the frame of the door section.

Fig. 14 is a fragmentary elevation showing the lower corner of the upper door section and the adjacent upper corner of the lower section with the door in closed position and a bolt set in locking position.

A sectional view of the same parts is shown in Fig. 15.

Fig. 16 shows a portion of the door at the top, together with the adjacent portion of the lintel equipped with means, releasable by the upward movement of the lower door section, for holding the top of the door firmly in position when closed.

A sectional view of the same parts is shown in Fig. 17 in an elevation taken at right angles to that of Fig. 16.

Figs. 18 and 19 illustrate a modified arrangement for guiding the upward movement of the lower section relative to the upper section, Fig. 18 being a fragmentary elevation which corresponds to Fig. 14, and Fig. 19 being a sectional plan view of the same parts.

Fig. 20 is a fragmentary elevation of a door, the upper section of which is equipped with an auxiliary means including a weight for bringing the top of the upper section into position to engage closely the lintel of the casing.

Fig. 21 illustrates a wedge arranged for holding the two door sections together and pressing them against the door casing when the door is closed.

Fig. 22 illustrates a wedge arranged for forcing the bottom of the lower door section against the door casing.

Fig. 23 is an outline elevation looking at the edge of the door of Figs. 1 and 2.

Still another modification of our invention is shown in Fig. 24 which is a partial front elevation of a single section door showing particularly a lock for holding the top of the door in position and having a readily accessible releasing handle.

Figs. 25 and 26 are elevations at right angles to Fig. 24, showing respectively a portion of the door at the top and a section near the bottom of the door.

A modified structure comprising two independently movable sections is shown in elevation in Fig. 27.

Fig. 28 corresponds to the upper part of Fig. 27, the arrangement of Fig. 28 differing from that of Fig. 27 in that the links, by which the door is supported, are longer and are pivoted materially above the top of the door opening.

A sectional detail of a door such as that shown in either Figs. 27 or 28, together with a portion of its casing, is shown in Fig. 29.

Still another modification of our invention is shown in Figs. 30 and 31, of which Fig. 30 is a front elevation looking from the interior and Fig. 31, a sectional elevation, of a door having a slidable section adapted to follow a gangplank and close the opening irrespective of the position to which the gangplank is adjusted.

An upper door section 35 and a lower door section 36 are adapted to close an opening formed between door posts 37 and a lintel or header 38. In the arrangement shown in Figs. 1 and 2 the upper section is materially longer than the lower section (the length being measured in each case in a vertical direction irrespective of the shape of the section). A pair of links 39 are pivotally suspended from the respective door posts 37 at corresponding points about on a level with the top of the door opening. These links are of sufficient length to extend approximately to the middle points of the edges of the upper section 35 to which they are pivotally connected.

For the last-named connection we prefer to employ a hollow stud 40 having a taper threaded portion 41 adjacent to one end, and an expanding bolt 42 extending through the hollow stud and having a tapered portion near its head which is drawn into place by a nut 43 as shown in Figs. 4 and 5. The upper door section 35 is provided with channels 44 which act as guideways for the lower section 36 as it is raised and overlaps the lower portion of the upper section. It is to these channels, as is shown in Fig. 5, that the hollow studs 40 are secured, each channel being provided with a tapped hole 45 to receive the tapered portion 41 of the stud. The bolt expands the threaded end of the stud and holds it very securely in place. The lower end of each of the links 39 is enlarged to form a hub 46 having a slot or opening 47 to receive one of the studs 40. This is for the purpose of providing a lost motion connection between each link and the door section with a view to relieving the links from strains in compression under operating conditions as hereinafter pointed out.

A convenient means for locking the door in its closed position is shown in Fig. 6 and comprises an angle bracket 48 secured to the top of the upper section 35 and a latch 49 pivotally mounted at 50 and arranged to lock onto the end of the bracket 48 when the door is closed. This obviously prevents the opening of the upper door section since it is first moved inwardly at the top. This lock is only effective in preventing the opening of the upper section and is intended for use in conjunction with some such lock as shown in Figs. 1 and 14 which prevent the upward movement of the lower section. The lower section is provided with a plate 49ª which is adapted to release the latch (see broken lines, Fig. 6) when the lower section is raised.

Secured to each of the posts 37 is a plate 51 which extends inwardly and overlaps the door sections. This plate is provided with a beveled surface 52 with which the beveled end of a sliding bolt 53 is adapted to coöperate. The bolt 53 is mounted to slide obliquely beyond the edge of the lower door sections to which it is secured by straps 54.

When the bolt is shot home it not only prevents the upward movement of the lower section but also forces the upper end of the lower section against the lower edge of the upper section and both sections into close engagement with the door casing. Thus the door is rendered practically weather-tight and is held against rattling or pounding under the influence of the wind.

In order that the lower section may run freely in the guide channel 44, it fits loosely therein, but when the door is closed and the bottom section completely lowered, wedge-blocks 55, which are secured to the lower section near its upper corners, come into engagement with a rivet head or other suitable enlargement 56 in the flange of the channel. The arrangement is such as to press the sections together. Therefore, the joint between the sections is held tight.

The hoisting mechanism, *per se*, forms no part of our present invention and may be of any suitable type. We prefer to employ however, a mechanism of the general form shown in Figs. 1 and 2 and comprising an overhead transverse shaft 57, counterweights 58, a hand chain 59 and suitable gearing 60. As pointed out hereinafter it is usually preferable also to provide independent counterweights for the upper section as shown in Fig. 3.

When the doors of the aforesaid character are intended for closing large openings having areas of 400 sq. ft. and upward, the structure of the door is particularly important because it is likely to be subjected to high wind pressures and because the strains produced by its weight are very great both when the door is closed and when it is elevated to a horizontal position.

The lower section of a two-section door such as shown in Figs. 1 and 2 is furthermore likely to be subjected to very severe shocks and strains in service. For example, heavy trucks and wagons may be backed into it, various articles of freight thrown against it, and its edges brought down heavily upon some article left in the doorway when the door is being closed, and it is obviously essential that they retain their shapes and cannot be bent or warped.

Furthermore, as more fully explained hereinafter, the weight of the two sections when they are each fully equipped, should be substantially equal in order to secure the best results with the counterweight arrangement set forth in the Ogden patent hereinbefore referred to.

With all of the foregoing points in view, we prefer to construct the door sections as shown in Figs. 1, 2 and 7 to 13 inclusive. Obviously the lower section cannot be provided with transverse truss rods on its outer surface, nor the lower portion of the upper section provided with truss rods on its inner surface on account of the overlapping of the sections in operating the door. A truss rod such as that shown in Fig. 9 comprising a bowed rod 61 having a central turn buckle 62 for drawing its parts together, is however only of service when applied to the interior of the door. Furthermore a truss of this character as previously constructed, has a tendency to bend the door outwardly in the center when applied to the interior and thus interferes to a greater or a less extent with the opening and closing of the door by reason of the distortion produced.

According to our invention we have provided what may be termed a "neutral" truss 63 which may be applied either to the interior or the exterior surface of the door and in either case will provide the necessary strengthening against the above-mentioned stresses without tending to produce a distortion of the door. This truss comprises a cross beam having tapering ends and securely bolted or otherwise affixed to the frame of the door.

By employing a pair of taper blocks 64, as shown in Fig. 9, of substantial dimensions, between the door frame and the strain rods 61, the tendency for this type of truss to distort the door is largely overcome. We have found it particularly advantageous to affix trusses to the door sections in the positions shown in Figs. 1, 2, 7 and 10, a truss 63$^a$ being affixed to the top of the upper section on its inner surface, a truss 63$^b$ to the outer surface of the central portion of the upper section where it does not interfere with the overlapping of the lower section, and trusses 63$^c$ and 63$^d$ to the inner surface of the the lower section, at its respective upper and lower edges. The truss 63$^b$ is necessarily a neutral truss since it is applied to the outer surface of the door and the other trusses may be either neutral of the type shown in Fig. 8, or of the bow rod type.

Since the counterweights act only on the lower section when the door is closed, their combined weight cannot exceed the weight of this section because they would otherwise hold it open. They are however found to be adequate for both sections if the two door sections are substantially equal in size and in weight to each other, because the center of gravity of the lower section is raised twice as fast during the vertical movement of this section as the center of gravity of both sections is raised while they are swung upwardly and inwardly.

In order to especially protect the lower section against injury and to make its weight more nearly equal to that of the upper section, we prefer to make the lower section of a relatively heavy planking as for example, yellow pine, while making the upper section of spruce or some other relatively light material. The lower edge of the bottom section is protected by an angle iron 65 and a sheet metal armor 66. Secured to its edges are channel strips 67 which run in the guide channel 44 of the upper section. The corners are furthermore protected by relatively heavy plates 68 which are held in place by bolts 69.

In Figs. 16 and 17, we have shown a convenient means for holding the top of the upper section firmly in position against the flange 70 of an angle iron, which is attached to the lintel or header 38. One of these devices may be applied to the center of the door section but two are preferably provided as shown in Fig. 1, one being attached near either side of the door.

Mounted to slide vertically on the transom or header is a bolt 71 which is guided by a bracket 72 and has an outwardly extending projection 73 at its lower end. The lower end of the bolt has a cam surface 74 which is adapted to act upon an angle bar 74$^a$ as a wedge in forcing the top of the door outwardly against the flange 70.

The bracket 73 has a cam surface 75 which is engaged by the upper end of a release bar 76. The bolt 71 serves not only to hold the top of the upper section firmly in position so that it cannot be slammed or rattled by the wind, but also to positively lock the door closed provided that the lower section is locked by some suitable means such as that shown in Figs. 14 and 15. The release bar 76 is mounted to slide in brackets 77 and 78 and its upper section 76$^a$ is hinged at 79 and is normally held in alinement with the body by a spring 80. The hinged connection of the upper section 76$^a$ allows the door to close, when the upper edge of angle bar 74$^a$ engages the cam surface 75 to raise the bolt without interference from the section 76$^a$.

The length of the bar 76 is such that its lower extremity is engaged by the upper end of the lower section when it is open and overlaps the upper section. It is therefore only necessary to release the lower section by releasing the bolts 53, to permit the opening of the door in the usual manner, by operating the hand chain 59.

It will be observed from Figs. 2 and 23 of the drawings that the point of connection between each of the links 39 and the door section is not directly below the upper point of pivot for the same link, the latter being outside the former so that there is a tendency for the toggle joint constituted by the door section and the link, to "break" inwardly when an upward pull is exerted on the bottom of the door. The arrangement of these points and the proportioning of the links may obviously be varied in one direction or the other, so as to either oppose the inward movement of the door top, in which case it is comparatively difficult to produce the necessary initial movement of the upper section in opening the door; or so that the top of the door may be swung inwardly with ease in which case wind pressure and other causes may cause an accidental opening or vibration of the door.

In Figs. 6 and 20, we have illustrated a simple means which may be employed for holding the upper end of the door in engagement with the ledge of the lintel, but permitting at the same time the door to be hung as shown in Fig. 23 and tend to open readily. This consists of a relatively small auxiliary weight 81 secured to the lower end of a chain 82 which is attached to the outer surface of the door at 83 and is led over guide pulleys 84—85. The guide pulleys 84—85 may be mounted in any suitable manner, the pulley 84 being mounted on a bracket 86 secured to the ledge or angle iron 70. The point of attachment 83 may be located at the center of the door or two complete devices may be provided, one on each side of the door. This arrangement may conveniently be employed in conjunction with a latch lock as shown in Fig. 6.

In Figs. 18 and 19 we have shown a convenient arrangement for guiding the door sections without the necessity of attaching anything to the box beam door posts of a well known cross-section. In this arrangement the box beam comprises an angle beam 87 and a channel beam 88 which are joined by an angle plate 89. As shown in Fig. 19 there are channels or pockets 90 produced by the arrangement of these parts and by attaching one or more shoes 91 to each of the guide channels 44 of the door section 35, the inner edge of the channel 88 and the adjacent edge of the angle iron 87 coöperate respectively with one of the door channels 44 and with the shoes 91.

Where it is not desired to lock the lower door section so that it cannot be opened from the outside, wedges 92 may be secured to the upper corners of the lower section as shown in Fig. 21, to coöperate with plates 93 which correspond to the plate 51 of Figs. 14 and 15. The location of the plate 93 and the proportioning of the wedges are such that the parts are only brought into engagement when the lower section has nearly reached its closed position. This then constitutes a simple means for holding both sections against the guide channels of the door casing and in engagement with each other.

As shown in Fig. 22, a stationary wedge block 94 may be secured to the guide channel on the door post, in such a position as to engage a pin or projection 95 on which the usual guide roller 96 of the door is mounted, the arrangement of parts being such that when the bottom of the door approaches the end of its travel in closing, the projection engages the wedge block and the lower end of the door is forced outwardly against the guide channels of the posts, thus holding the lower end of the door firmly in position.

In case a single section door such as that shown at 35$^A$ in Fig. 24, is employed, the door may overlap the door opening and no guides, other than those afforded by the wall, utilized except at the floor. At the lower corners of the door a pair of guide members 97 (shown in Fig. 26 but omitted in Fig. 24) are suitably located and coöperate with the usual rollers 98 to hold the bottom of the door in place when closed.

A modified lock and top wedge is shown as attached to the door in Figs. 24 and 25. This structure comprises a sliding bolt 99 which is actuated by a hand lever 100 pivotally mounted in a short channel 101 of the door. This channel thus serves as a protection for the lever as well as a means for pivotally attaching one of the supporting links 39ª.

The roller 98 is secured to a pin 102 which is mounted in a short channel 103 near the lower corner of the door.

The link 39ª is pivotally suspended from a stationary bracket 104 which is provided with a beveled edge surface 105 and constitutes a keeper with which the upper end of the bolt 99 coöperates.

The parts are so arranged that when the hand lever is thrown in one direction the bolt is forced inwardly and the door jammed tightly against the wall at the top. One of these locking devices is preferably provided near each lateral edge of the door.

The operation of the door shown in Figs. 1 and 2 will be readily understood from the foregoing description of its parts and the operation of its attachments, but it will now be outlined with a view to specially emphasizing the advantages of the lost motion connection at one end of each of the links 39.

Assuming that the door is closed and that the hand chain 59 is actuated, the door section 36 is first raised in the guideways provided by the channels 44, its lower end being guided by the door posts and overlaps the upper section. The upward movement of the lower section is limited in the usual manner and further actuation of the chain 59 causes the toggle joint between the links 39 and the upper door section to break inwardly. As the lower end of the door is guided vertically, the upper end swings inwardly until both sections occupy substantially horizontal positions as shown in broken lines in Fig. 2.

In order to relieve the links, stationary brackets 130 (only one of which is shown) are provided in the path of the upper corners of the door which are lifted thereby during the last part of the opening movement and finally rest upon them. It is clearly difficult to place the brackets and hang the door with sufficient accuracy to avoid putting a heavy compression strain upon each link which is likely to bend and spoil the operation of the door, consequently we avoid possibility of difficulty from this cause by providing a pin and slot connection at one end of each of the links. The links are therefore relieved of all strains as soon as the outer end of the door is lifted by the brackets.

When large heavy doors are raised into a substantially horizontal position, it is particularly desirable to provide supporting means near the inner end which is materially spaced from the lintel of the door. When suspension links have hitherto been employed, a considerable difficulty has been encountered by reason of the fact that the links were subjected to very heavy strains in compression. Not only is this difficulty overcome by the use of the lost motion connections in the links, as above indicated, but also by making the slots of greater or less length, the position of the door, when open, may be varied, so that it will leave more overhead space, while, at the same time the links perform their function of supporting a portion of the weight of the door during the first part of the opening operation. In other words, the slot and pin connections provided between the links and the door are such as to permit a transfer of weight from the links to the supporting means, which relieves the links as the door is fully opened.

In lowering the door the upper section first returns in place and finally the lower section slides downwardly and completely closes the door opening.

Modified door structures are shown in Figs. 27 and 28 which are arranged to permit either or both of the sections of a two-section door to be raised independently of each other. These doors have the advantage of permitting the upper section to be opened to admit light and air while the lower section is closed and may prevent the entrance of intruders. Guide rollers 110 instead of being located at the bottom of the lower section are placed at the lower corner of the upper section to which points hoisting chains 111 are attached. The main counterweights 112 are suspended from the opposite ends of these chains which extend over the usual hoisting mechanism.

With this arrangement there is no necessity or advantage in making the weight of the smaller bottom section equal to the larger upper section and consequently it will usually be lighter and equipped with independent counterweights 113 and hoisting chains 114 which are connected to the lower section at substantially the middle points of its lateral edges.

In Fig. 27 the suspension links 39ᵇ extend from about the middle of the upper section to the top of the door opening while in Fig. 28 materially longer ones 39ᶜ are used and extend about equally above and below the top of the door opening. The latter arrangement has the advantage of placing less strain on the links when the door is open, and is preferable where sufficient overhead room is available.

The upper section has a guide channel 115 at each edge with which the lower section loosely coöperates so that both sections may be raised together if desired.

Fig. 29 illustrates a simple means for providing a guide when the box beams constituting the door posts have the sections shown. An angle strip 116 is attached to the plate 117 of the beam and extends outwardly therefrom to engage the face of the roller 110.

Independent counterweights are employed for the respective door sections, as clearly shown in outline in Fig. 3, when the door sections are unequal in size so that their centers of gravity do not substantially coincide when the bottom section is raised, although they are not arranged to open independently of each other. The counterweights and attachments of the door sections are numbered to correspond to the parts of the door shown in Figs. 27 and 28, except that the suffix "a" is added to each. The hoisting chain 114$^a$ is attached to lower door section 115$^a$ near the bottom.

The door 35$^B$ shown in Figs. 30 and 31 corresponds to the single-section door of Fig. 4 except that there is mounted to slide upon it and suspended from it a follower or apron section 121 which may be narrower than the door and is adapted to fit to a wharf-drop or gangway 128 which is movable up and down. The door has spaced guide channels 120 forming grooves into which an apron section 121 extends. The weight of this section is borne by counterweights 122 and connecting chains which extend over sheaves 123 mounted on the face of the door near its upper end. This mechanism is independent of the main hoisting mechanism which may be of any suitable form.

Variations in size and arrangement of parts may be effected within the spirit and scope of our invention but we intend that only such limitations be imposed as are indicated in appended claims.

What we claim is:

1. A door, means for guiding horizontally opposite parts of the door, lifting means connected to the door near said guided parts, suspension means constructed to provide for lost motion connected to said door at opposite points above said guided parts adapted to support a portion of the weight of the door during any predetermined part of its upward movement, and means adapted to receive that portion of the weight of the door which is supported by the suspension means during said predetermined part of its upward movement, at the end of said predetermined part of its upward movement and to support said part of the weight of the door during the remainder of its upward movement.

2. A door, means for guiding horizontally opposite parts of the door, lifting means connected to the door near said guided parts, suspension links pivotally supported at points above the door opening and with the door at intermediate points on its respective edges above the guided parts thereof, said links being each provided with a lost motion connection and means for picking up and supporting the inner end of the door at any desired part of its opening movement before the points of connection of the links with the edges of the door have reached the full extent of their upward movement and supporting a part of the weight of the door during the remainder of its opening movement.

3. A door, means for guiding horizontally opposite parts of the door, counterweights connected to the door near said guided parts, suspension links pivotally supported at points above the door opening and having a lost motion connection with the door at intermediate points on the edges of the door above the guided parts thereof, and a shelf bracket arranged to pick up and support the inner end of the door at any predetermined part of its opening movement before the points of connection of the links with the edges of the door have reached the full extent of their upward movement and arranged to support a part of the weight of the door during the remainder of its opening movement.

4. A door, means for vertically guiding the lower corners of the door, counterweights connected to the door near said lower corners, suspension links pivotally supported at points above the door opening and having a lost motion connection with the door at intermediate points on the edges of the door above the lower corners thereof, and an inclined shelf bracket arranged to pick up and support the inner end of the door at any predetermined part of its opening movement before the points of connection of the links with the edges of the door have reached the full extent of their upward movement and arranged to lift the inner edges of the door during the remainder of its opening movement.

5. A door, means for guiding the bottom of the door vertically, links for throwing the top of the door inwardly as the bottom is raised, and a weight tending to close the door.

6. A door, means for guiding the bottom of the door vertically, links for throwing the top of the door inwardly as the bottom is raised, a weight tending to close the door, and an automatic catch for locking the top of the door in its closed position.

7. A door, a hoisting mechanism and counterweights therefor, means for guiding the bottom of the door vertically, suspension links for throwing the top of the door inwardly as the bottom is raised, and a weight tending to close the door.

8. Spaced stationary members on the respective sides of a door opening, a door overlapping the edges of the stationary members and having rollers adapted to engage the overlapped surfaces of the respective members, and an inclined projection from each of said members extending close to the outer side surface of the adjacent roller.

9. Spaced stationary members on the respective sides of a door opening, a door overlapping the edges of the stationary members and having rollers adapted to engage the overlapped surfaces of the respective members, and an angle strip secured to each member and having a web extending outwardly at an oblique angle at close proximity to the plane outer surface of the adjacent roller.

10. A door comprising an upper section, a lower section adapted to overlap the upper section when opened, a stationary projection and a slidable bolt mounted on said lower section and adapted to act as a wedge to be forced under the projection.

11. A door frame, an overlapping door comprising an upper section and a lower section adapted to overlap the upper section when open, a stationary bracket projection overhanging the upper corner of the lower section when closed, and an obliquely slidable bolt mounted on said lower door section and adapted to act as a wedge to be forced under the overhanging bracket projection to force the door sections together and against the frame.

12. A door comprising a relatively long upper section extending from the top more than half way to the bottom of the door opening, a lower section which is relatively short from top to bottom and is adapted to overlap the lower part of the upper section and provide an alternate relatively low door opening, a hoisting mechanism comprising counterweights operatively connected to the lower section, and independent auxiliary counterweights for the upper section.

13. A door comprising a relatively long upper section extending from the top more than half way to the bottom of the door opening, and a lower section which is relatively short from top to bottom and is adapted to overlap the lower part of the upper section and provide an alternate relatively low door opening, independent counterweights for the two sections, and means operatively connected to the lower section for opening and closing the door.

14. A door comprising an upper section having channel strips secured to its respective edges, means for vertically guiding said upper section near the bottom, suspension links secured to the upper section at corresponding intermediate points near its edges, and hoisting and counterweight mechanism for elevating the upper section into a horizontal plane above the door opening; a lower section mounted to slide in the channel strips of the upper section and an independent counterweight and hoisting mechanism for the lower section, the arrangement of parts being such that either section may be opened independently or both sections opened together.

15. Spaced parallel posts, a door comprising two sections adapted to close the opening between said posts, one of said door sections having guide channels secured to it near its respective edges, the other of the door sections adapted to overlap the first and to coöperate with the guide channels thereof, coacting means on one of the door sections and on the posts adapted to be brought into engagement with each other upon closure of the door sections so as to force the door sections together and against the posts when said door sections occupy a predetermined relation.

16. A door having shoes or fenders extending from its opposite edges, spaced stationary members on the respective sides of the door opening having flat surfaces overlapped by the door, narrow edged surfaces spaced from the flat surfaces parallel to the door edges and coöperating with the shoes or fenders to guide the door.

17. A door having shoes or fenders extending from its opposite edges and spaced stationary members on the respective sides of the door opening having narrow edged surfaces parallel to the door edges, and coöperating with the shoes or fenders to guide the door.

18. A door comprising a plurality of sections arranged to overlap and swing inwardly and upwardly in opening, a latch adapted to lock the top of the door in closed position, a release bar actuated by one of the lower sections by its overlapping movement, and permitting said latch to engage the door in closing with the release bar in its actuated position.

In testimony whereof, we have hereunto set our hands in the presence of two subscribing witnesses, this 27th day of April, 1914.

JOHN EDWARD OGDEN.
ARTHUR T. PRESCOTT.

Witnesses:
I. B. MOORE,
D. E. DEUTSCH.